(12) United States Patent
Williams et al.

(10) Patent No.: US 10,935,153 B2
(45) Date of Patent: Mar. 2, 2021

(54) PROPORTIONAL FLOW CONTROL VALVE POPPET WITH FLOW CONTROL NEEDLE

(71) Applicant: MAC Valves, Inc., Wixom, MI (US)

(72) Inventors: Kevin C. Williams, Wixom, MI (US); David M. Sobka, Jr., Plymouth, MI (US)

(73) Assignee: MAC Valves, Inc., Wixom, MI (US)

(*) Notice: Subject to any disclaimer, the term of this patent is extended or adjusted under 35 U.S.C. 154(b) by 38 days.

(21) Appl. No.: 16/258,993

(22) Filed: Jan. 28, 2019

(65) Prior Publication Data
US 2020/0240536 A1    Jul. 30, 2020

(51) Int. Cl.
| | |
|---|---|
| F16K 1/50 | (2006.01) |
| F16K 31/04 | (2006.01) |
| F16K 1/38 | (2006.01) |
| F16K 1/42 | (2006.01) |
| F16K 31/06 | (2006.01) |
| F16K 31/50 | (2006.01) |
| F16K 41/10 | (2006.01) |

(52) U.S. Cl.
CPC ............... *F16K 31/04* (2013.01); *F16K 1/38* (2013.01); *F16K 1/42* (2013.01); *F16K 1/422* (2013.01); *F16K 1/50* (2013.01); *F16K 31/047* (2013.01); *F16K 31/0655* (2013.01); *F16K 31/50* (2013.01); *F16K 31/508* (2013.01); *F16K 41/10* (2013.01)

(58) Field of Classification Search
CPC ... F16K 1/38; F16K 1/42; F16K 1/422; F16K 1/50; F16K 31/04; F16K 31/047; F16K 31/0655; F16K 31/50; F16K 31/508; F16K 41/10

USPC ............ 251/129.11, 129.12, 267, 270, 335.2
See application file for complete search history.

(56) References Cited

U.S. PATENT DOCUMENTS

| | | | |
|---|---|---|---|
| 5,351,936 A | 10/1994 | Tanikawa et al. | |
| 5,419,531 A | 5/1995 | Hoehn | |
| 6,561,480 B1 * | 5/2003 | Komiya | F16K 1/50 251/129.12 |

(Continued)

FOREIGN PATENT DOCUMENTS

| | | |
|---|---|---|
| DE | 9218213 U1 | 9/1993 |
| EP | 3045788 A1 | 7/2016 |

OTHER PUBLICATIONS

Extended European Search Report from Application No. 20153614.1-1015 dated Jun. 18, 2020.

*Primary Examiner* — Matthew W Jellett
(74) *Attorney, Agent, or Firm* — Harness, Dickey & Pierce, P.L.C.

(57) ABSTRACT

A flow control valve including a valve body, stepper motor, and valve member. The valve member includes a poppet that can slide longitudinally within a bore of the valve body when the stepper motor receives electricity. A diaphragm, extending inwardly from the valve body to the valve member, deflects in response to movement of the valve member. A flow control needle, mounted to the poppet of the valve member, is at least partially received in an outlet port of the valve body. The flow control needle cooperates with an inner surface of the outlet port to define an outlet flow orifice that varies in size when the valve member moves between open and closed positions. In the closed position, a seat engagement surface of the valve member contacts a valve seat of the valve body to create a fluid-tight seal.

20 Claims, 9 Drawing Sheets

(56) References Cited

U.S. PATENT DOCUMENTS

| | | | | |
|---|---|---|---|---|
| 7,114,699 B2* | 10/2006 | Hull | .................. | F16K 1/306 |
| | | | | 251/121 |
| 8,292,262 B2* | 10/2012 | Hasunuma | ................ | F16K 7/12 |
| | | | | 137/513.3 |
| 8,794,591 B2* | 8/2014 | Arai | .................. | F01L 1/352 |
| | | | | 251/129.11 |
| 8,800,959 B2* | 8/2014 | Hasunuma | .............. | F16K 31/04 |
| | | | | 137/554 |
| 8,851,448 B2* | 10/2014 | Harada | ................. | F16K 31/04 |
| | | | | 251/129.11 |
| 10,473,231 B2* | 11/2019 | Hirai | .................. | F16K 3/12 |
| 2001/0022353 A1 | 9/2001 | Takeda et al. | | |
| 2003/0006389 A1* | 1/2003 | Fukano | ................. | F16K 31/04 |
| | | | | 251/129.11 |
| 2003/0062495 A1* | 4/2003 | Long | .................. | F16K 1/42 |
| | | | | 251/122 |
| 2013/0142675 A1 | 6/2013 | Nabei et al. | | |
| 2016/0290525 A1* | 10/2016 | Hotta | ................... | F16K 31/047 |
| 2017/0002931 A1 | 1/2017 | Shu et al. | | |

\* cited by examiner

PROPORTIONAL FLOW CONTROL VALVE POPPET WITH FLOW CONTROL NEEDLE

FIELD

The present disclosure relates to flow control valves operated by a stepper motor and more particularly to flow control valves that are sealed by a diaphragm and include a flow control needle.

BACKGROUND

This section provides background information related to the present disclosure which is not necessarily prior art.

Flow control valves can be operated by a stepper motor to improve repeatability of valve member positions for valves requiring increased accuracy in controlling flow variability between a fully open and a fully closed position. Applications requiring an accurate delivery of fluid volume or fluid pressure to a working device can benefit from the accuracy provided by a stepper motor compared to other known valve actuators. However, known stepper motor actuated flow control valves typically require a gear system or a multi-directional drive system to change the rotational force of the stepper motor to a longitudinal force used to translate a valve member in a reciprocating manner between open and closed valve positions. Common drive systems therefore lose operating force in order to drive multiple moving parts. The complexity, power loss, and tolerance of the multiple moving parts of known systems also decreases position accuracy and repeatability of the valve positions, which are some of the primary reasons for using a stepper motor for valve actuation in the first place.

The valve member used in typical stepper motor actuated flow control valves, such as a poppet valve, controls the flow of fluid, such as pressurized air, through a manifold. Such manifolds may be part of equipment such as sorters, packaging machines, food processors, paper-making machines, and the like. The valve member typically includes a rubber overmold and/or the valve member closes against a rubber valve seat to create a fluid-tight seal. Such flow control valves may be operated for millions of cycles. Overtime, the rubber overmold on the valve member and/or the rubber valve seat can wear or permanently deform, reducing the accuracy (i.e., flow resolution) of the flow control valve.

In typical flow control valves, the valve member is slidingly arranged within a valve body. In the closed position, a valve member is generally held in contact with a valve seat of the valve body. In the open position, the stepper motor generally moves the valve member away from the valve seat forming a clearance gap therebetween. As disclosed in U.S. Pat. No. 3,985,333 to Paulsen, a bellows shaped diaphragm can be used to provide a seal between the valve body and the valve member. Such diaphragms can prevent contaminants from working their way into the motor housing while permitting longitudinal movement of the valve member.

The valve body is designed to be received in a bore provided in the manifold. The manifold usually includes multiple passageways that are arranged in fluid communication with the manifold bore. In operation, the flow control valve controls fluid flow between these multiple passageways. O-ring seals are typically provided on the outside of the valve body to seal the valve body within the manifold bore.

Although stepper motor actuated flow control valves increase the accuracy of the fluid volume or fluid pressure that can be delivered to a working device, flow control valves within improved accuracy are still needed. Particularly, there remains a need for flow control valves that can provide better flow resolution at low fluid flowrates.

SUMMARY

This section provides a general summary of the disclosure, and is not a comprehensive disclosure of its full scope or all of its features.

The subject disclosure provides for an improved flow control valve that includes a valve body and a stepper motor that is connected to the valve body. The valve body has a distal valve body end and a proximal valve body end. A poppet bore extends through the valve body along a longitudinal axis. The distal valve body end includes a valve seat. A valve member is disposed within the poppet bore. The valve member includes a poppet and a drive head. The poppet is connected to the drive head and can slide within the poppet bore between open and closed positions. The poppet includes a distal poppet end and a proximal poppet end.

The drive head includes a threaded bore and the stepper motor has a shaft that is threadably engaged with the threaded bore in the drive head. The stepper motor operates to longitudinally displace the valve member in a longitudinal direction, parallel to the longitudinal axis, between the open and closed positions. The valve member includes a seat engagement surface that contacts the valve seat in the closed position and that is displaced away from the valve seat in the open position.

A diaphragm extends inwardly from the valve body to the valve member. The diaphragm is connected to the valve body and the valve member and deflects in response to movement of the valve member along the longitudinal axis. The flow control valve includes an inlet port and an outlet port. The inlet and outlet ports each extend through the valve body to the poppet bore.

A flow control needle is mounted to the poppet of the valve member. The flow control needle protrudes from the distal poppet end and is at least partially received in the outlet port when the valve member is in the closed position. The flow control needle cooperates with an inner surface of the outlet port to define an outlet flow orifice that varies in size when the valve member moves between the open and closed positions. In accordance with this design, the interface between the flow control needle and the inner surface of the outlet port controls the flowrate instead of the interface between the seat engagement surface of the valve member and the valve seat of the valve body. In other words, the interface between the flow control needle and the inner surface of the outlet port controls the flowrate and the interface between the seat engagement surface of the valve member and the valve seat of the valve body creates a fluid-tight seal when the valve member is in the closed (i.e., zero flow) position. Because the sealing interface is separate from the flow control interface, variations and deformation in the vicinity of the sealing interface does not affect the flow control interface, resulting in improved accuracy (i.e., flow resolution).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure, where:

Corresponding reference numerals indicate corresponding parts throughout the several views of the drawings.

DETAILED DESCRIPTION

Figure 1:
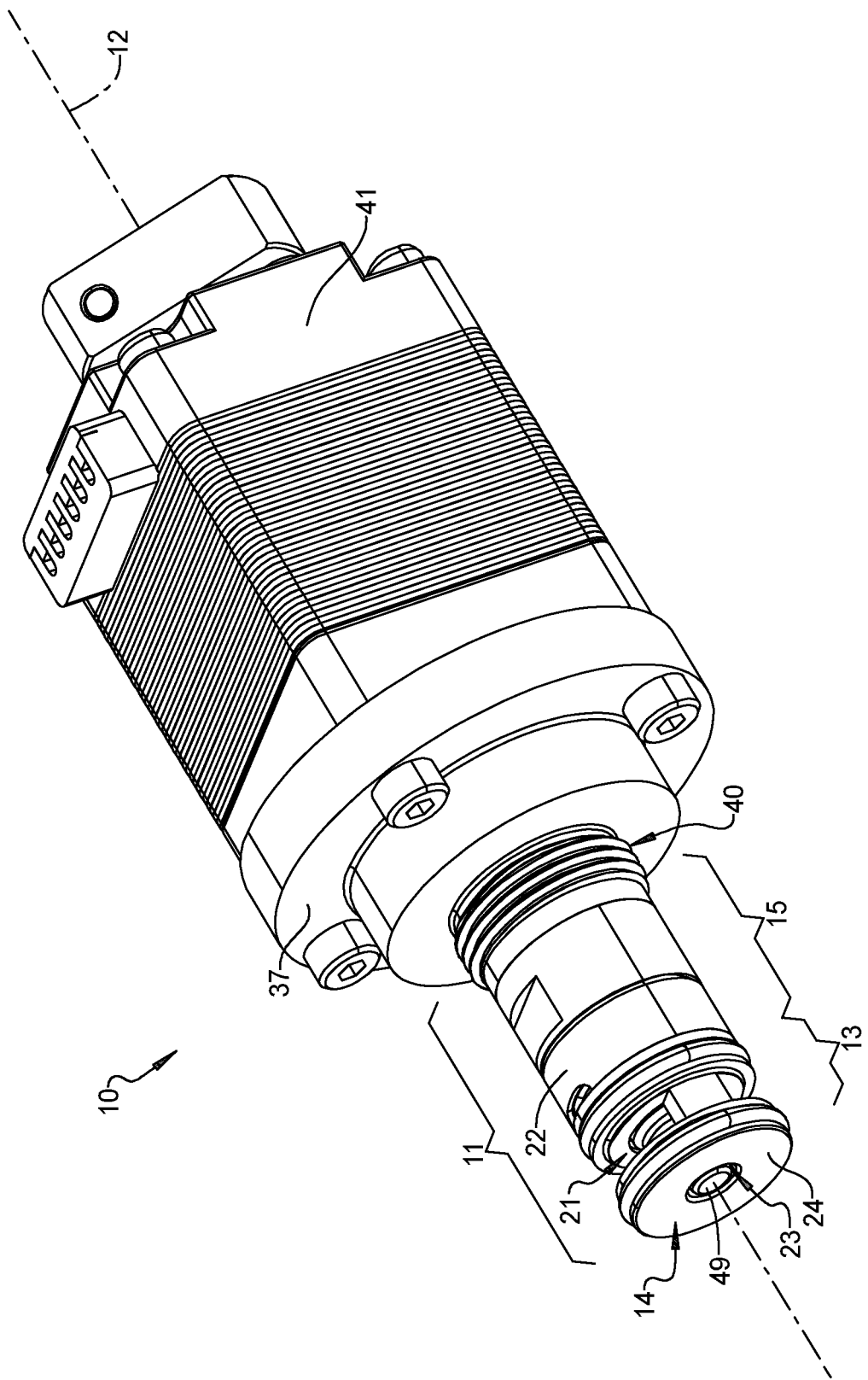
FIG. 1 is a side perspective view of an exemplary flow control valve constructed in accordance with the present disclosure.
Figure 2:
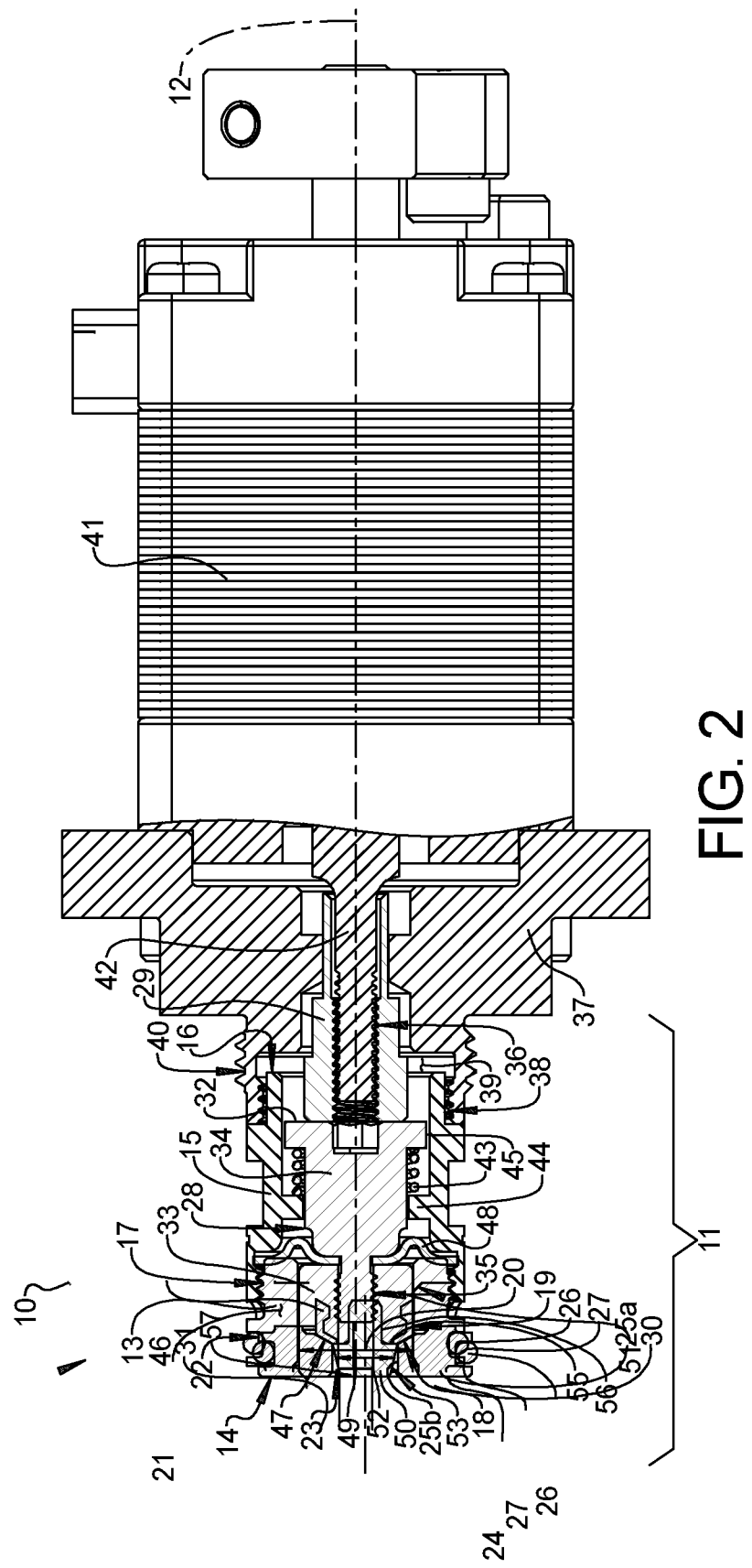
FIG. 2 is a partial side cross-sectional view of the exemplary flow control valve illustrated in FIG. 1.

Example embodiments will now be described more fully with reference to the accompanying drawings. These example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," engaged to, "connected to," or "coupled to" another element or layer, it may be directly on, engaged, connected or coupled to the other element or layer, or intervening elements or layers may be present. In contrast, when an element is referred to as being "directly on," directly engaged to, "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1-4, a flow control valve 10 constructed in accordance with the present disclosure is shown. The flow control valve 10 includes a valve body 11 that extends along a longitudinal axis 12. It should be appreciated that the terms "longitudinal," "longitudinally," "axial," and "axially," when used herein, mean along or parallel to the longitudinal axis 12. The valve body 11 has a first valve body portion 13 defining a distal valve body end 14 and a second valve body portion 15 defining a proximal valve body end 16. In the illustrated example, the first and second valve body portions 13, 15 are connected to each other by a first threaded connection 17. The first valve body portion 13 includes a valve seat 18 that is positioned at the distal valve body end 14. The valve body 11 includes a poppet bore 19 that extends through the first and second valve body portions 13, 15 and coaxially along the longitudinal axis 12. The poppet bore 19 has a bore diameter 20. The valve body 11 can be made from various materials, including without limitation, stainless steel or nickel-plated brass.

An inlet port 21 extends through the first valve body portion 13 from the poppet bore 19 to a ported face 22 of the valve body 11. An outlet port 23 extends through the first valve body portion 13 from the poppet bore 19 to an end face 24 of the valve body 11. Although other configurations are possible, in the example shown in FIGS. 1-4, the inlet port 21 and the outlet port 23 have inner surfaces 25a, 25b. The outlet port 23 is co-axially aligned with the longitudinal axis 12 and the inlet port 21 is arranged perpendicular to the longitudinal axis 12. The valve seat 18 is positioned between the inlet port 21 and the outlet port 23. Optionally, one or more seal members 26, such as O-rings, may be positioned in one or more circumferential slots 27 created in the first valve body portion 13 on opposing sides of the inlet port 21.

A valve member 28 is slidably disposed in the poppet bore 19 and is oriented coaxially with the longitudinal axis 12. The valve member 28 includes a poppet 30. The poppet 30 extends between a distal poppet end 31 and a proximal poppet end 32. In the illustrated example, the poppet 30 includes a first poppet segment 33 that defines the distal poppet end 31 and a second poppet segment 34 that defines the proximal poppet end 32. The first poppet segment 33 is slidingly received in the first valve body portion 13 and the second poppet segment 34 is slidingly received in the second valve body portion 15. The second poppet segment 34 extends longitudinally between the first poppet segment 33 and the drive head 29. The first and second poppet segments 33, 34 are connected by a second threaded connection 35. The drive head 29 has a female threaded bore 36. The poppet 30 can be made from various materials, including without limitation, aluminum, stainless steel, or plastic.

Figure 3:
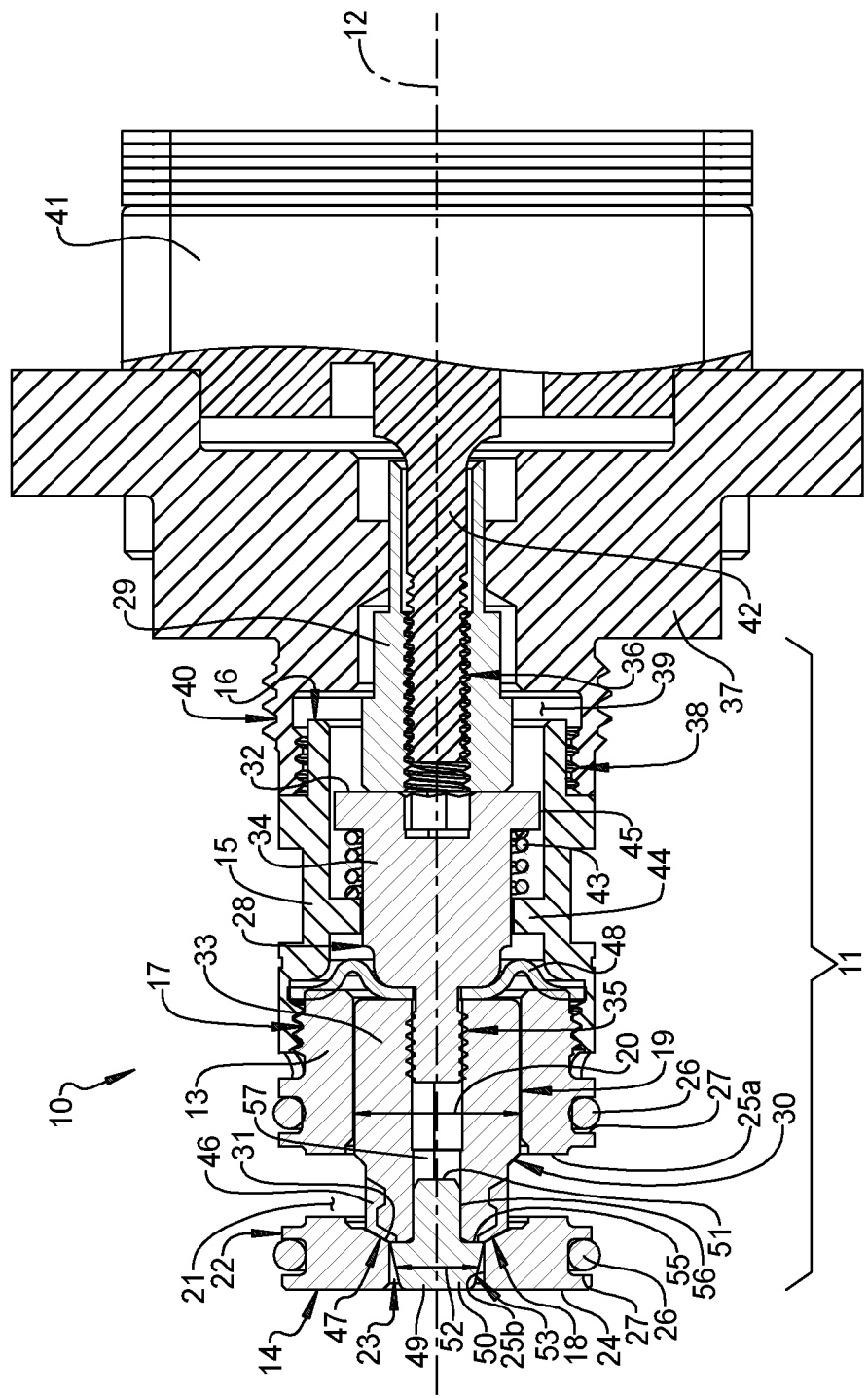
FIG. 3 is an enlarged partial side cross-sectional view of the exemplary flow control valve illustrated in FIG. 1 where the flow control valve is shown in a closed position.
Figure 4:
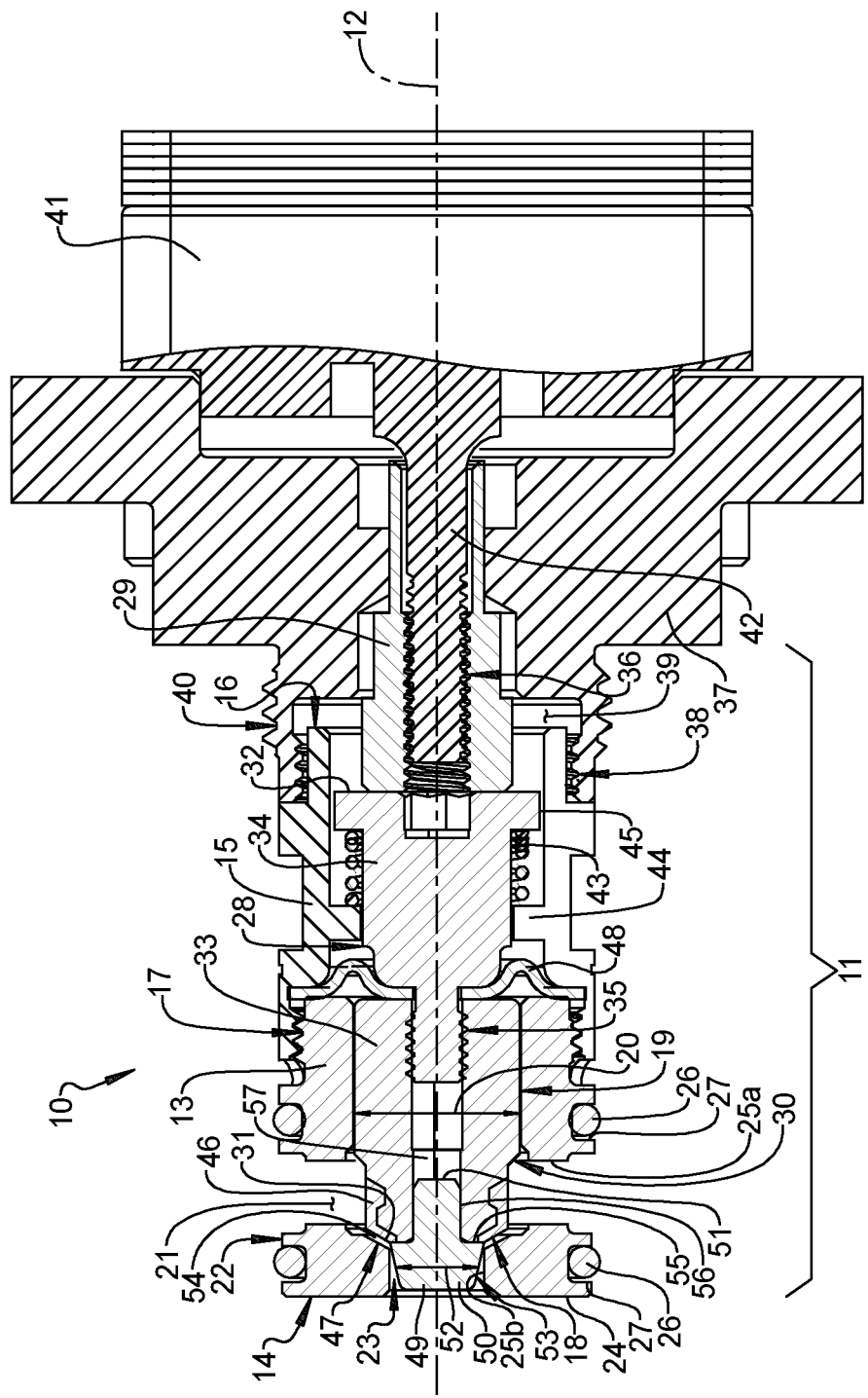
FIG. 4 is another enlarged partial side cross-sectional view of the exemplary flow control valve illustrated in FIG. 1 where the flow control valve is shown in an open position.
Figure 5:
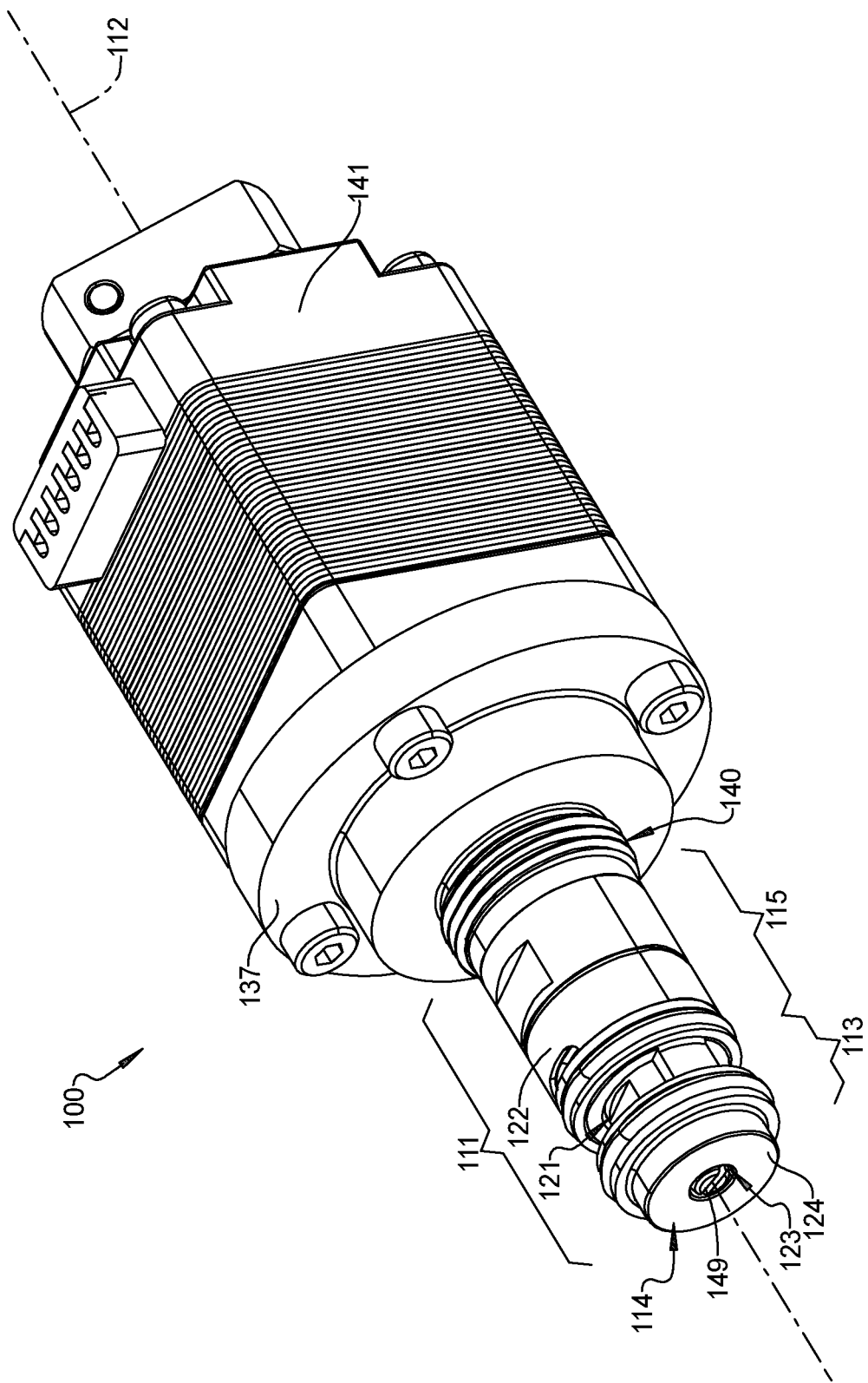
FIG. 5 is a side perspective view of another exemplary flow control valve constructed in accordance with the present disclosure.
Figure 6:
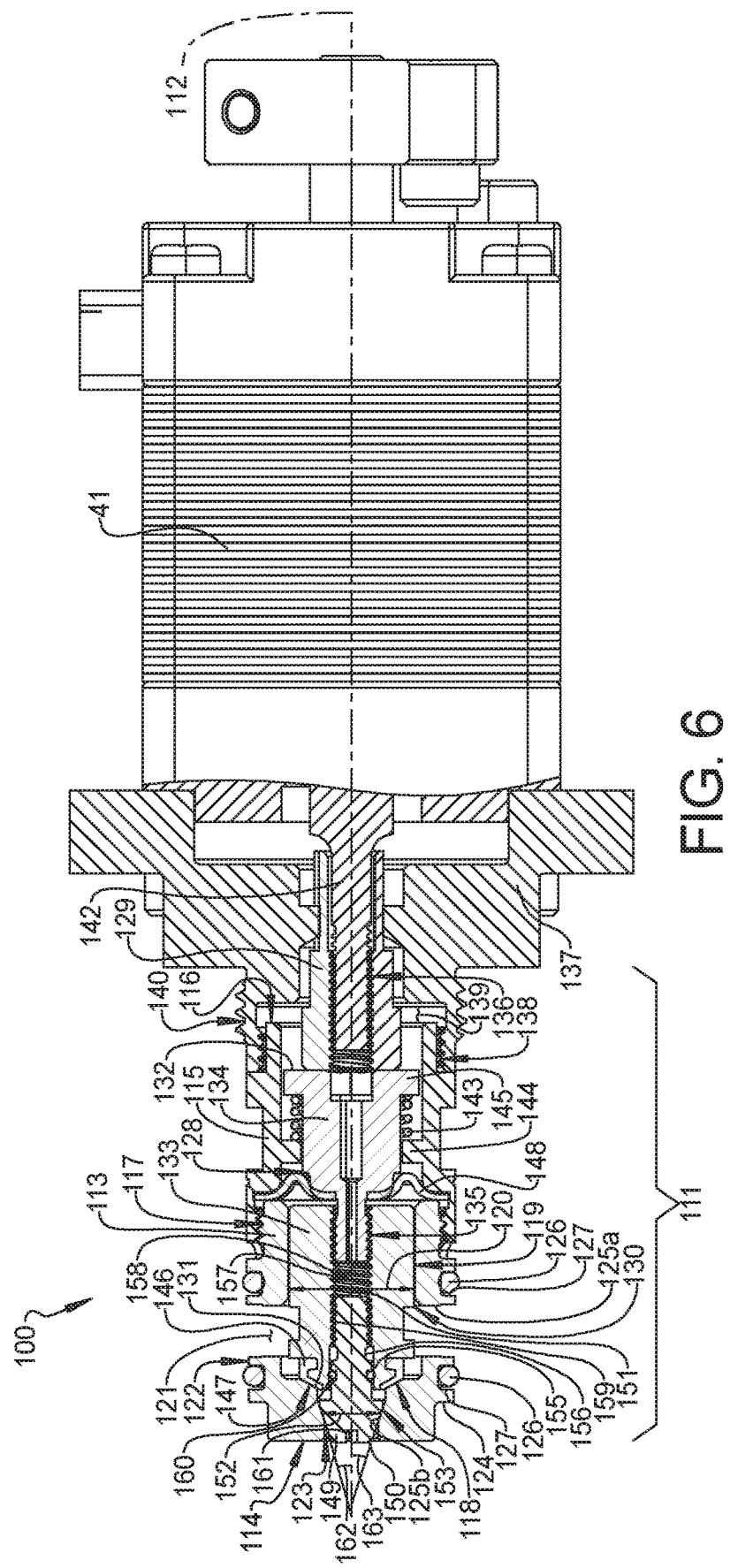
FIG. 6 is a partial side cross-sectional view of the exemplary flow control valve illustrated in FIG. 5.

A drive adapter 37 is connected to the proximal valve body end 16 by a third threaded connection 38. The drive adapter 37 includes a head receiving cavity 39 that receives at least part of drive head 29. As will be explained in greater detail below, the drive adapter 37 may optionally have external threads 40 for installation purposes. A stepper motor 41 is connected to the drive adapter 37. The stepper motor 41 operates to rotate a shaft 42 that is threadably engaged with the threaded bore 36 in the drive head 29 to longitudinally displace the valve member 28 in a longitudinal direction over a range of longitudinal positions between a closed position (FIG. 3) and an open position (FIG. 4).

The male threaded shaft 42 is connected to and extends from the stepper motor 41. The male threaded shaft 42 of the stepper motor 41 is threadably received in the female threaded bore 36 created in the drive head 29. The male threaded shaft 42 can be directly or indirectly connected to and rotatably driven by stepper motor 41. The male threaded shaft 42 is directly threadably received in female threaded bore 36 and is coaxially aligned with respect to the longitudinal axis 12. Rotation of male threaded shaft 42 therefore directly axially moves the drive head 29 based on complete or partial revolutions of the male threaded shaft 42, to move the valve member 28 between the open and closed positions. The shape of the head receiving cavity 39 prevents rotation of the drive head 29 so that rotation of the male threaded shaft 42 is converted into axial displacement of the drive head 29. The pitch of the threads on the male threaded shaft 42 and the female threaded bore 36 can vary and can be selected to provide different stroke lengths and actuation speeds. By way of example and without limitation, the stroke length of the valve member 28 in the illustrated embodiment is approximately 0.35 millimeters.

Rotation of the male threaded shaft 42 of the stepper motor 41 in a first rotational direction longitudinally displaces the valve member 28 in the poppet bore 19 from the closed position (FIG. 3) to the open position (FIG. 4) and rotation of the male threaded shaft 42 in an opposite second rotational direction returns the valve member 28 from the open position (FIG. 4) to the closed position (FIG. 3), and vice versa. Incremental rotation of the stepper motor 41 in the first and second rotational directions rotates the male threaded shaft 42 within the threaded bore 36 of the drive head 29, which incrementally translates (i.e., moves) the valve member 28 in first and second longitudinal directions.

The drive head 29 is detached (i.e. separate) from the second poppet segment 34 of the valve member 28. Notwithstanding, the drive head 29 abuts the proximal poppet end 32 of the valve member 28 such that the drive head 29 drives the valve member 28 between the closed position (FIG. 3) and the open position (FIG. 4). The proximal poppet end 32 is held in contact with the drive head 29 by a biasing member 43 that biases the poppet 30 towards the drive head 29. In the illustrated example, the biasing member 43 is a coil spring that is disposed between a shoulder 44 of the valve body 11, which extends radially inwardly into the poppet bore 19 and a flange 45 that extends radially outwardly from the proximal poppet end 32. As a result, the biasing member 43 extends helically about a portion of the second poppet segment 34 and presses against the shoulder 44 of the valve body 11 and the flange 45 of the second poppet segment 34 to help maintain contact between the proximal poppet end 32 and the drive head 29. The biasing member 43 applies a biasing force to the poppet 30 that acts to bias the poppet 30 towards the drive head 29.

The longitudinal position of the valve member 28 is repeatable based in part on the limited slip between the threads of male threaded shaft 42 and the female threaded bore 36. The biasing force that the biasing member 43 applies to the poppet 30 and thus the drive head 29 mitigates axial dimensional changes resulting from thread clearances and/or wear to further enhance the repeatability of the longitudinal position of the valve member 28. The valve member 28 includes a seat engagement member 46 that defines a seat engagement surface 47. The seat engagement surface 47 of the seat engagement member 46 contacts the valve seat 18 when the valve member 28 is in the closed position. The seat engagement surface 47 of the seat engagement member 46 is spaced away from the valve seat 18 when the valve member 28 is in the open position. Although other configurations are possible, in the illustrated example, the seat engagement member 46 is made of a resilient material such as rubber that is overmolded on the first poppet segment 33 at the distal poppet end 31. Alternatively, the valve seat 18 may be made of a resilient material. The interface between the seat engagement surface 47 of the seat engagement member 46 and the valve seat 18 functions as a sealing interface that stops fluid flow from the inlet port 21 to the outlet port 23 (i.e., creates a zero flow condition through the flow control valve 10) when the valve member 28 is in the closed position.

The flow control valve 10 includes a diaphragm 48 that extends radially inwardly from the valve body 11 to the valve member 28. In the illustrated example, an outer circular portion of the diaphragm 48 is received between the proximal and distal valve body portions 13, 15 and an inner circular portion of the diaphragm 48 is received between the first and second poppet segments 33, 34. More specifically, the first threaded connection 17 between the proximal and distal valve body portions 13, 15 permits the outer circular portion of the diaphragm 48 to be clamped between the proximal and distal valve body portions 13, 15 and the second threaded connection 35 between the first and second poppet segments 33, 34 permits the inner circular portion of the diaphragm 48 to be clamped between the first and second poppet segments 33, 34.

The diaphragm 48 deflects in response to movement of the valve member 28 along the longitudinal axis 12. The diaphragm 48 provides an atmospheric seal for the flow control valve 10 to prevent a fluid, such as pressurized air or water, and contaminants from entering the head receiving cavity 39 in the drive adapter 37 and the stepper motor 41. Although other configurations are possible, the diaphragm 48 shown in the illustrated embodiment has a bellows-like portion with a U-shaped cross-section that increases the flexibility of the diaphragm 48.

A flow control needle 49, mounted to the first poppet segment 33, protrudes from the distal poppet end 31 of the valve member 28. At least part of the flow control needle 49 is received in the outlet port 23 when the valve member 28 is in the closed position (FIG. 3). The flow control needle 49 extends along the longitudinal axis 12 between a distal flow control needle end 50 and a proximal flow control needle end 51. Although other arrangements are possible depending on the stroke of the valve member 28, in the illustrated example, the distal flow control needle end 50 remains concentrically aligned inside the outlet port 23 of the valve body 11 in both the open and closed positions of the flow control valve 10.

The flow control needle 49 has a needle diameter 52 that varies at the distal flow control needle end 50. More particularly, the distal flow control needle end 50 has a tapered surface 53 that cooperates with the inner surface 25*b* of the outlet port 23 to define an outlet flow orifice 54 that is created by the gap between the tapered surface 53 of the distal flow control needle end 50 and the inner surface 25*b* of the outlet port 23 when the flow control valve 10 is in the open position (FIG. 4). Due to the tapered shape of the distal flow control needle end 50, the outlet flow orifice 54 varies in size when the valve member 28 moves between the closed and open positions. More particularly, the outlet flow orifice 54 has a cross-sectional area in the shape of a circular ring that varies in size depending on the longitudinal position of the valve member 28. By way of example and without limitation, in the illustrated embodiment the maximum cross-sectional area of the outlet flow orifice 54 is approximately 2 square millimeters when the valve member 28 is in the open position.

The tapered surface 53 of the flow control needle 49 gives the distal flow control needle end 50 a frusto-conical shape. Although other arrangements are possible, in the example illustrated in FIGS. 2-4, the flow control needle 49 includes a radial step 55 that is positioned longitudinally between the distal and proximal flow control needle ends 50, 51 where the diameter of the flow control needle 49 transitions from a larger diameter to a smaller diameter barrel portion 56 at the proximal flow control needle end 51. The radial step 55 extends radially inwardly such that the radial step 55 is transverse to the longitudinal axis 12. The first poppet segment 33 of the valve member 28 has a poppet bore 57 that extends along the longitudinal axis 12 to the distal poppet end 31. The barrel portion 56 of flow control needle 49 is received in a press-fit within the poppet bore 57. The flow control needle 49 can be made from various materials, including, without limitation, stainless steel when the fluid passing through the flow control valve 10 is a liquid and aluminum when the fluid passing through the flow control valve 10 is air.

In the valve closed position shown in FIG. 3, the valve seat 18 engagement face on the distal poppet end 31 is held in contact with the valve seat 18 on the first valve body portion 13. Accordingly, the flow control valve 10 prevents fluid flow between the inlet and outlet ports 21, 23 when flow control valve 10 is in the valve closed position. In the valve open position shown in FIG. 4, the seat engagement surface 47 on the distal poppet end 31 moves away from the valve seat 18 on the first valve body portion 13, thereby providing a flow path from the inlet port 21 to the outlet port 23. As the stepper motor 41 drives the valve member 28 between the closed position (FIG. 3) and the open position (FIG. 4), the diaphragm 48 flexes to accommodate the translation of the valve member 28.

With reference to FIGS. 5-8, another flow control valve 100 is illustrated. Many of the elements of the flow control valve 100 shown in FIGS. 5-8 are the same or substantially the same as the elements of the control valve shown in FIGS. 2-4, except as noted below. Equivalent elements shared between the embodiments have corresponding reference numbers where 100s have been used to label the equivalent elements in FIGS. 5-8.

The flow control valve 100 illustrated in FIGS. 5-8 includes an adjustable flow control needle 149. More specifically, the poppet bore 157 includes internal threads 158 and the barrel portion 156 of the flow control needle 149 includes barrel threads 159 that thread into and engage the internal threads 158 in the poppet bore 157. An O-ring seal 160 is optionally provided on the barrel portion 156 of the flow control needle 149 near the radial step 155 to provide a fluid-tight seal between the barrel portion 156 of the flow control needle 149 and the poppet bore 157. The distal flow control needle end 150 includes a tool interface 161 permitting rotational adjustment of the flow control needle 149 within the poppet bore 157. Rotation of the flow control needle 149 within the poppet bore 157 changes the longitudinal position of the flow control needle 149 relative to the distal poppet 130 segment and thus a longitudinal distance measured between the distal flow control needle end 150 and the distal poppet end 131. By adjusting the longitudinal position of the flow control needle 149 relative to the poppet 130, the size of the cross-sectional area of the outlet flow orifice 154 can be adjusted to fine tune the fluid flowrate through the flow control valve 100. This adjustability also accommodates variances due to manufacturing tolerances. For example, the flow control valve 100 can be easily tuned during the manufacturing process, where the flow control needle 149 is backed-out (i.e., unthreaded) until the tapered surface 153 at the distal flow control needle end 150 makes initial contact with the inner surface 125*b* of the outlet port 123 when the valve member 128 is in the closed position. If wear occurs, this process can be repeated to re-established proper tolerances between the flow control needle 149 and the outlet port 123.

Figure 7:
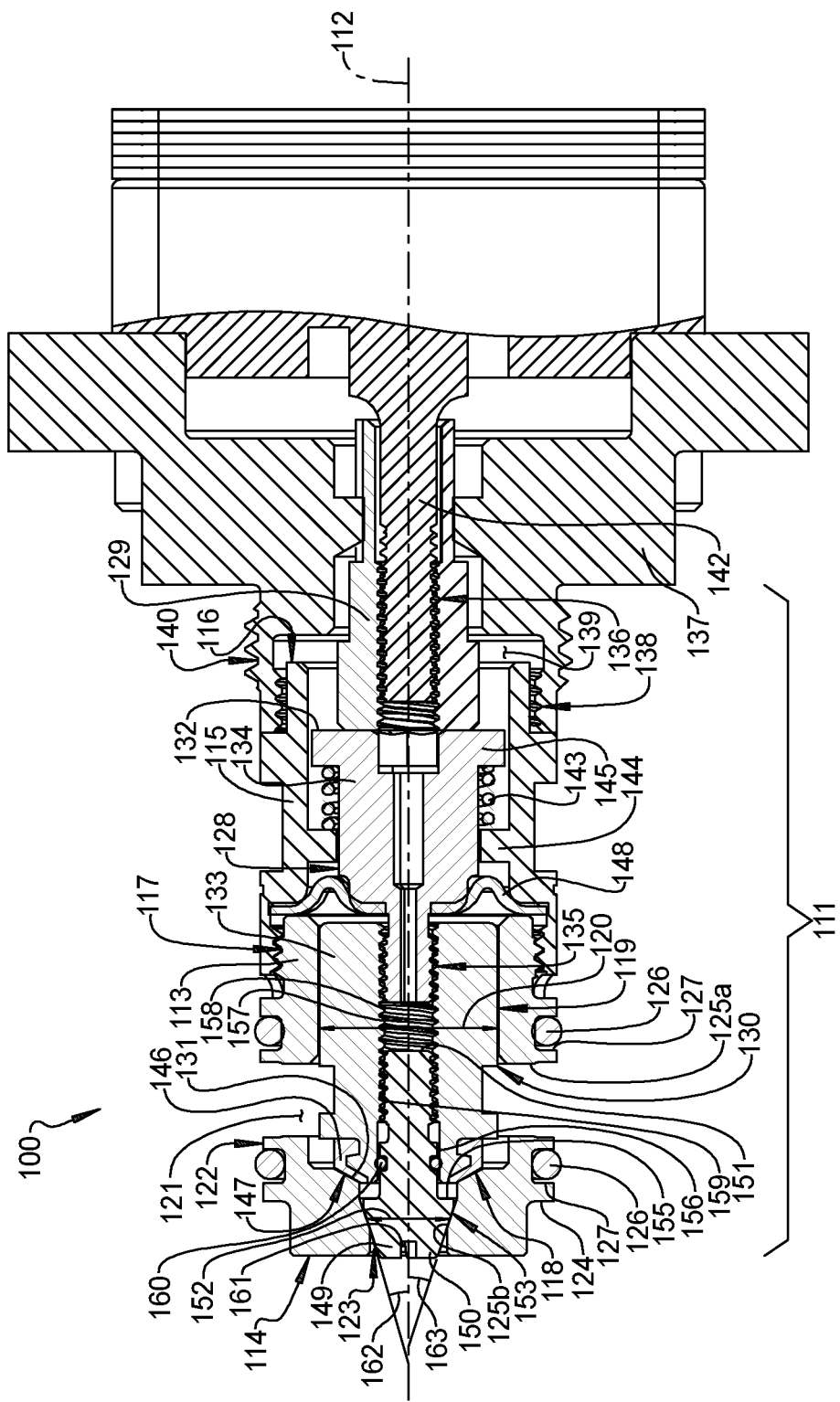
FIG. 7 is an enlarged partial side cross-sectional view of the exemplary flow control valve illustrated in FIG. 5 where the flow control valve is shown in a closed position.
Figure 8:
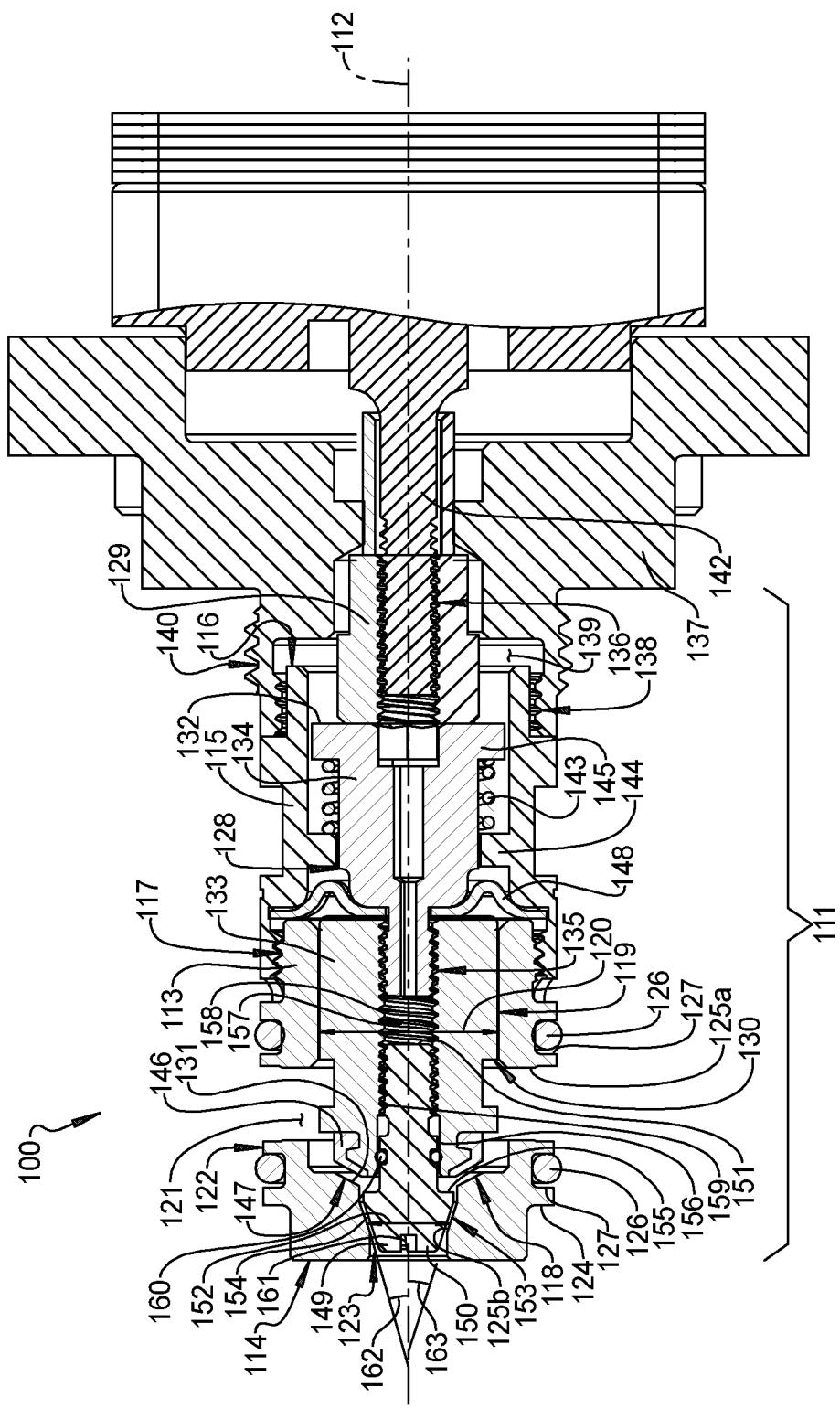
FIG. 8 is another enlarged partial side cross-sectional view of the exemplary flow control valve illustrated in FIG. 5 where the flow control valve is shown in an open position.

In the embodiment shown in FIGS. 5-8, the inner surface 125*b* of the outlet port 123 in the first valve body portion 113 has a sloped, funnel-like shape. At least part of the tapered surface 153 on the distal flow control needle end 150 contacts the inner surface 125*b* of the outlet port 123 when the valve member 128 is in the closed position (FIG. 7). The tapered surface 153 of the distal flow control needle end 150 is arranged at a first angle 162 relative to the longitudinal axis 112. The inner surface 125*b* of the outlet port 123 is arranged at a second angle 163 relative to the longitudinal axis 112. The first angle 162 is different from the second angle 163 by at least one degree. This arrangement helps prevent the distal poppet end 131 from binding in the outlet port 123 when the valve member 128 is in the closed position.

Figure 9:
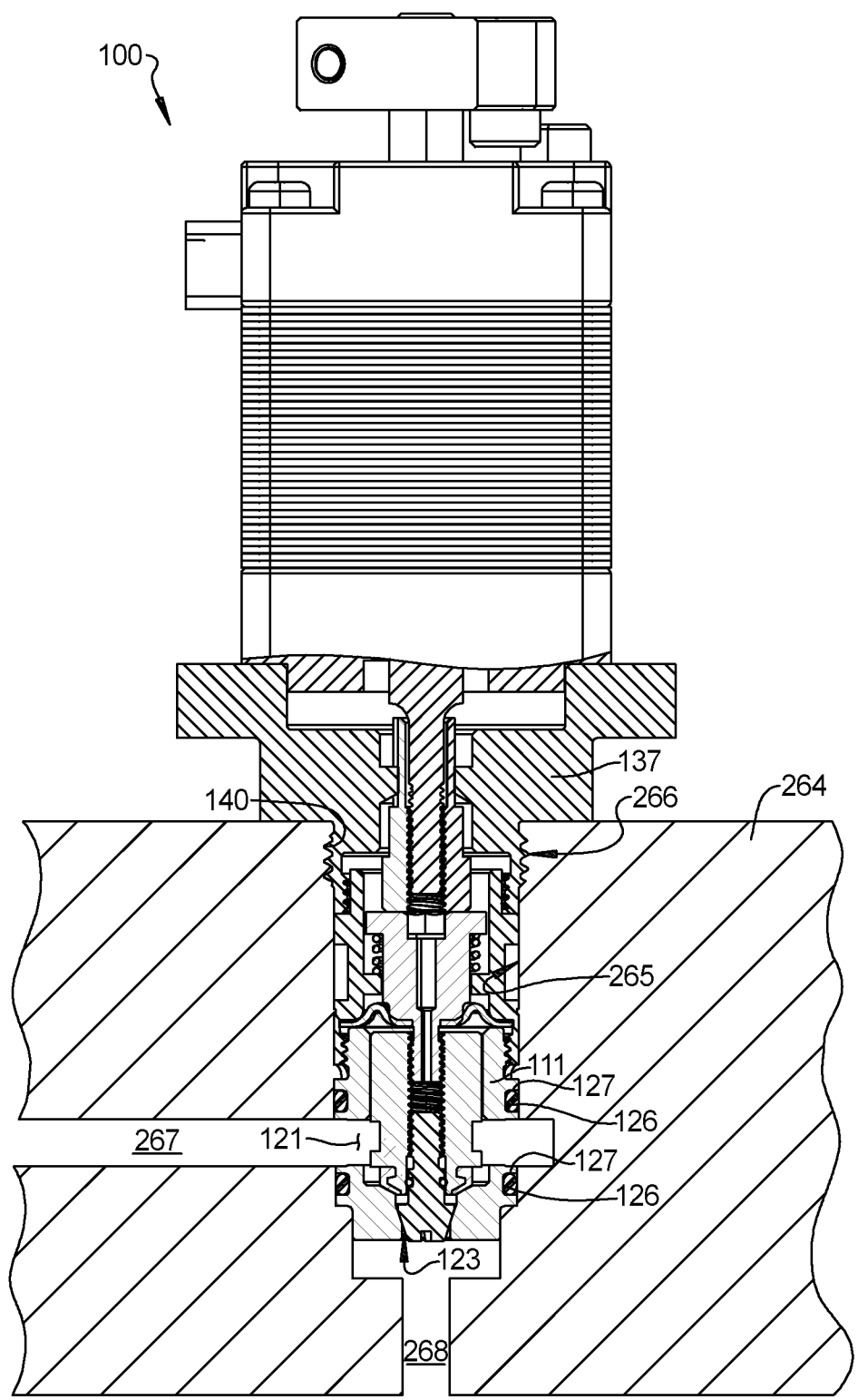
FIG. 9 is a partial side cross-sectional view of the exemplary flow control valve of FIG. 5 shown installed in a manifold.

Referring to FIG. 9, flow control valve 100 is shown installed in a manifold 264. The manifold 264 includes a manifold bore 265. The valve body 111 of the flow control valve 100 is slidably inserted into the manifold bore 265 and the external threads 140 on the drive adapter 137 threadingly engage a threaded portion 266 of the manifold bore 265. The seal members 126, such as O-rings, positioned in the circumferential slots 127 created in valve body 111 contact the manifold bore 265 and create a fluid seal. When the valve body 111 is installed in the manifold bore 265, the inlet and outlet ports 121, 123 are positioned in fluid communication with inlet and outlet passageways 267, 268 of the manifold 264, respectively. In operation, the flow control valve 100 controls the flow of fluid, such as pressurized air, between the inlet and outlet passageways 267, 268 in the manifold 264.

Each of the flow control valves 10, 100 of the present disclosure provides variable flow control by incremental rotation of the stepper motor 41, 141. Incremental rotation of the stepper motor 41, 141 is translated into longitudinal translation of the valve member 28, 128. Also, as the valve member 28, 128 moves toward an open position, a pressure drop is created across the inlet and outlet ports 21, 23, 121, 123. Because the poppet bore 19, 119 in which the valve member 28, 128 is slidably received has equal diameters at the contact points of the valve member 28, 128 and valve body 11, 111, each port section balances forces acting on the valve member 28, 128.

The flow control valves 10, 100 of the present disclosure offer several advantages. The accuracy (i.e., flow resolution) through the flow control valves 10, 100 disclosed herein is significantly improved because the outlet flow orifice 54, 154 is defined by the interface (i.e., gap) between the tapered surface 53, 153 of the flow control needle 49, 149 and the inner surface 25*b*, 125*b* of the outlet port 23, 123 instead of the interface (i.e., gap) between the valve seat 18, 118 and the seat engagement member 46, 146. In typical valves, the seat engagement member 46, 146 and/or the valve seat 18, 118 deflect and rebound small amounts when the valve member 28, 128 moves between the open and closed positions, which results in small changes in the gap between these two components. In addition, the seat engagement member 46, 146 and/or the valve seat 18, 118 can become worn and/or can permanently deform over time due to repeated valve cycles. These variations limit the accuracy of typical valves, particularly at lower fluid flowrates. The flow control valves 10, 100 disclosed herein have an outlet flow orifice 54, 154 (i.e., flow control interface) that is separate from the sealing interface between the valve seat 18, 118 and seat engagement member 46, 146. As a result, deflection, rebound, wear, and deformation in the valve seat 18, 118 and/or seat engagement member 46, 146 do not affect the interface between the flow control needle 49, 149 and the outlet port 23, 123, increasing the accuracy of the flow control valves 10, 100. For example, the flow control valves 10, 100 disclosed herein have been found to have improved resolution at flowrates of 670 milliliters per minute down to 30 milliliters per minute at a pressure of 29 pounds per square inch.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A flow control valve comprising:
a valve body having a distal valve body end, a proximal valve body end, a poppet bore extending along a longitudinal axis, and a valve seat positioned at said distal valve body end;
an inlet port and an outlet port each extending through said valve body to said poppet bore, said outlet port having an inner surface;
a valve member slidably disposed in said poppet bore, said valve member including a drive head and a poppet, said poppet including a distal poppet end and a proximal poppet end, and said drive head having a threaded bore;
a stepper motor having a shaft that is threadably engaged with said threaded bore in said drive head, said stepper motor operating to longitudinally displace said valve member in a longitudinal direction, parallel to said longitudinal axis, between a closed position and an open position;
said valve member including a seat engagement surface that contacts said valve seat in said closed position and that is displaced away from said valve seat in said open position;
a diaphragm extending between and connected to said valve body and said valve member such that said diaphragm deflects in response to movement of said valve member along said longitudinal axis;
a flow control needle mounted to said poppet that protrudes from said distal poppet end and is at least partially received in said outlet port when said valve member is in said closed position, said flow control needle cooperating with said inner surface of said outlet port to define an outlet flow orifice that varies in size when said valve member moves between said closed and open positions; and
said flow control needle having an adjustable longitudinal position relative to said distal poppet end to accommodate variances due to manufacturing tolerances and wear.

2. The flow control valve as set forth in claim 1, wherein said flow control needle extends between a distal flow control needle end and a proximal flow control needle end.

3. The flow control valve as set forth in claim 2, wherein said distal flow control needle end includes a tapered surface that cooperates with said inner surface of said outlet port to define a cross-sectional area of said outlet flow orifice that varies in size depending on the longitudinal position of said valve member.

4. The flow control valve as set forth in claim 3, wherein said tapered surface gives said distal flow control needle end a frusto-conical shape.

5. The flow control valve as set forth in claim 4, wherein said inner surface of said outlet port has a sloped, funnel-like shape.

6. The flow control valve as set forth in claim 5, wherein at least part of said tapered surface of said distal flow control needle end contacts said inner surface of said outlet port when said valve member is in said closed position and wherein said tapered surface of said distal flow control needle end is arranged at a first angle relative to said longitudinal axis and said inner surface of said outlet port is arranged at a second angle relative to said longitudinal axis.

7. The flow control valve as set forth in claim 6, wherein said first angle is different from said second angle by at least one degree so as to prevent binding when said valve member is in said closed position.

8. The flow control valve as set forth in claim 4, wherein said flow control needle includes a radial step that is positioned longitudinally between said distal and proximal flow control needle ends where said flow control needle transitions from a larger diameter to a smaller diameter.

9. The flow control valve as set forth in claim 4, wherein said inner surface of said outlet port has a cylindrical shape.

10. The flow control valve as set forth in claim 2, wherein said poppet includes a poppet bore that extends along said longitudinal axis to said distal poppet end.

11. The flow control valve as set forth in claim 10, wherein said poppet bore has internal threads and wherein said proximal flow control needle end is received in said poppet bore in threaded engagement with said internal threads.

12. The flow control valve as set forth in claim 11, wherein said distal flow control needle end includes a tool interface permitting rotational adjustment of said flow control needle within said poppet bore such that rotation of said flow control needle within said poppet bore changes a longitudinal distance measured between said distal flow control needle end and said distal poppet end.

13. The flow control valve as set forth in claim 10, wherein said proximal flow control needle end is received within said poppet bore.

14. The flow control valve as set forth in claim 2, wherein said flow control needle has a diameter that varies at said distal flow control needle end.

15. The flow control valve as set forth in claim 1, wherein said seat engagement surface is positioned at said distal poppet end and is radially outward of said flow control needle.

16. The flow control valve as set forth in claim 1, wherein at least one of said valve seat and said seat engagement surface is made of a resilient material.

17. The flow control valve as set forth in claim 1, wherein said poppet includes a first poppet segment defining said distal poppet end and a second poppet segment that extends between said first poppet segment and said drive head and wherein a portion of said diaphragm is clamped between said first and second poppet segments.

18. A flow control valve comprising:
a valve body defining a longitudinal axis;
said valve body having a first valve body portion defining a distal valve body end and a second valve body portion defining a proximal valve body end;
said valve body including a poppet bore that extends through said first and second valve body portions and coaxially along said longitudinal axis;
said first valve body portion including a valve seat positioned at said distal valve body end;
said poppet bore having a bore diameter;
a valve member slidably disposed in said poppet bore and oriented coaxially with said longitudinal axis;
said valve member including a drive head and a poppet;
said poppet including a first poppet segment defining a distal poppet end and a second poppet segment defining a proximal poppet end;
said first poppet segment slidingly received in said first valve body portion;
said second poppet segment slidingly received in said second valve body portion and extending longitudinally between said first poppet segment and said drive head;
said drive head having a threaded bore;
a drive adapter connected to said proximal valve body end;
said drive adapter including a head receiving cavity that receives at least part of said drive head;
a stepper motor connected to said drive adapter;
said stepper motor operating to rotate a shaft that is threadably engaged with said threaded bore in said drive head to longitudinally displace said valve member in a longitudinal direction, parallel to said longitudinal axis, over a range of longitudinal positions between a closed position and an open position;
an inlet port extending through said valve body from said poppet bore to a ported face of said valve body;
an outlet port extending through said valve body from said poppet bore to an end face of said valve body;
said outlet port being co-axially aligned with said longitudinal axis;
said valve member including a seat engagement member at said distal poppet end that defines a seat engagement surface that contacts said valve seat in said closed position and that is displaced away from said valve seat in said open position;
said seat engagement member being made of a resilient material;
wherein rotation of said shaft of said stepper motor in a first rotational direction longitudinally displaces said valve member in said poppet bore from said closed position to said open position and rotation of said shaft in an opposite second rotational direction returns said valve member from said open position to said closed position,
wherein said shaft of said stepper motor is a threaded shaft that is connected to and extends from said stepper motor such that incremental rotation of said stepper motor rotates said threaded shaft within said threaded bore of said drive head to incrementally translate said valve member in said longitudinal direction;
wherein said valve member is detached from said drive head and said proximal poppet end is held in contact with said drive head by a biasing member that biases said valve member toward said drive head,
wherein said biasing member is a spring disposed between a shoulder of said valve body in said poppet bore and a flange on said second poppet segment;
a diaphragm extending inwardly from said valve body that is received between said first and second poppet segments of said valve member such that said diaphragm deflects in response to movement of said valve member along said longitudinal axis;
a threaded connection between said first and second poppet segments that permits said diaphragm to be clamped between said first and second poppet segments;
said first poppet segment of said valve member including a poppet bore that extends along said longitudinal axis to said distal poppet end;
said outlet port having an inner surface;
a flow control needle mounted to said first poppet segment that protrudes from said distal poppet end and is at least partially received in said outlet port when said valve member is in said closed position;
said flow control needle extending along said longitudinal axis between a distal flow control needle end and a proximal flow control needle end;
said distal flow control needle end being concentrically aligned inside said outlet port;
said distal flow control needle end including a tapered surface that cooperates with said inner surface of said outlet port to define an outlet flow orifice that varies in size when said valve member moves between said closed and open positions;
said outlet flow orifice having a cross-sectional area that varies in size depending on said longitudinal position of said valve member;
said flow control needle having a diameter that varies at said distal flow control needle end;
said tapered surface giving said distal flow control needle end a frusto-conical shape and creating a radial step positioned longitudinally between said distal and proximal flow control needle ends where said diameter of said flow control needle transitions from a larger diameter to a smaller diameter;
said inner surface of said outlet port having a cylindrical shape;
at least part of said tapered surface of said distal flow control needle end contacting said inner surface of said outlet port when said valve member is in said closed position; and
said flow control needle having an adjustable longitudinal position relative to said distal poppet end such that said size of said cross-sectional area of said outlet flow orifice is adjustable independent of any longitudinal displacement of said valve member.

19. A flow control valve comprising:
a valve body defining a longitudinal axis;
said valve body having a first valve body portion defining a distal valve body end and a second valve body portion defining a proximal valve body end;
said valve body including a poppet bore that extends through said first and second valve body portions and coaxially along said longitudinal axis;
said first valve body portion including a valve seat positioned at said distal valve body end;
said poppet bore having a bore diameter;
a valve member slidably disposed in said poppet bore and oriented coaxially with said longitudinal axis;
said valve member including a drive head and a poppet;
said poppet including a first poppet segment defining a distal poppet end and a second poppet segment defining a proximal poppet end;
said first poppet segment slidingly received in said first valve body portion;
said second poppet segment slidingly received in said second valve body portion and extending longitudinally between said first poppet segment and said drive head;
said drive head having a threaded bore;
a drive adapter connected to said proximal valve body end;
said drive adapter including a head receiving cavity that receives at least part of said drive head;
a stepper motor connected to said drive adapter;
said stepper motor operating to rotate a shaft that is threadably engaged with said threaded bore in said drive head to longitudinally displace said valve member in a longitudinal direction, parallel to said longitudinal axis, over a range of longitudinal positions between a closed position and an open position;
an inlet port extending through said valve body from said poppet bore to a ported face of said valve body;
an outlet port extending through said valve body from said poppet bore to an end face of said valve body;
said outlet port being co-axially aligned with said longitudinal axis;
said valve member including a seat engagement member at said distal poppet end that defines a seat engagement surface that contacts said valve seat in said closed position and that is displaced away from said valve seat in said open position;
said seat engagement member being made of a resilient material;
wherein rotation of said shaft of said stepper motor in a first rotational direction longitudinally displaces said valve member in said poppet bore from said closed position to said open position and rotation of said shaft in an opposite second rotational direction returns said valve member from said open position to said closed position,
wherein said shaft of said stepper motor is a threaded shaft that is connected to and extends from said stepper motor such that incremental rotation of said stepper motor rotates said threaded shaft within said threaded bore of said drive head to incrementally translate said valve member in said longitudinal direction;
wherein said valve member is detached from said drive head and said proximal poppet end is held in contact with said drive head by a biasing member that biases said valve member toward said drive head,
wherein said biasing member is a spring disposed between a shoulder of said valve body in said poppet bore and a flange on said second poppet segment;
a diaphragm extending inwardly from said valve body that is received between said first and second poppet segments of said valve member such that said diaphragm deflects in response to movement of said valve member along said longitudinal axis;
a threaded connection between said first and second poppet segments that permits the diaphragm to be clamped between said first and second valve poppet segments;
said first poppet segment of said valve member including a poppet bore that extends along said longitudinal axis to said distal poppet end;
said outlet port having an inner surface;
a flow control needle mounted to said first poppet segment that protrudes from said distal poppet end and is at least partially received in said outlet port when said valve member is in said closed position;
said flow control needle extending along said longitudinal axis between a distal flow control needle end and a proximal flow control needle end;
said distal flow control needle end being concentrically aligned inside said outlet port;
said distal flow control needle end including a tapered surface that cooperates with said inner surface of said outlet port to define an outlet flow orifice that varies in size when said valve member moves between said closed and open positions;
said outlet flow orifice having a cross-sectional area that varies in size depending on said longitudinal position of said valve member;
said flow control needle having a diameter that varies at said distal flow control needle end;
said tapered surface giving said distal flow control needle end a frusto-conical shape and creating a radial step positioned longitudinally between said distal and proximal flow control needle ends where said diameter of said flow control needle transitions from a larger diameter to a smaller diameter;
said inner surface of said outlet port having a sloped, funnel-like shape;

at least part of said tapered surface of said distal flow control needle end contacting said inner surface of said outlet port when said valve member is in said closed position;

said tapered surface of said distal flow control needle end being arranged at a first angle relative to said longitudinal axis and said inner surface of said outlet port being arranged at a second angle relative to said longitudinal axis;

said first angle being different from said second angle by at least one degree to avoid binding when said valve member is in said closed position;

said poppet bore having internal threads;

said proximal flow control needle end received in said poppet bore in threaded engagement with said internal threads; and said distal flow control needle end including a tool interface permitting rotational adjustment of said flow control needle within said poppet bore such that rotation of said flow control needle within said poppet bore changes a longitudinal distance measured between said distal flow control needle end and said distal poppet end.

20. The flow control valve as set forth in claim 1, wherein said poppet is detached from said drive head and said proximal poppet end is held in contact with said drive head by a biasing member that biases said poppet toward said drive head.

* * * * *